US008938498B2

(12) United States Patent
Brewer et al.

(10) Patent No.: US 8,938,498 B2
(45) Date of Patent: Jan. 20, 2015

(54) UNINTERRUPTABLE GROUP COMMUNICATION SESSIONS WITHIN A WIRELESS COMMUNICATIONS SYSTEM

(75) Inventors: Beth A. Brewer, Canyonlake, TX (US); Hamsini Bhaskaran, San Diego, CA (US); Ashutosh Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 12/751,565

(22) Filed: Mar. 31, 2010

(65) Prior Publication Data
US 2010/0257461 A1 Oct. 7, 2010

Related U.S. Application Data

(60) Provisional application No. 61/166,611, filed on Apr. 3, 2009.

(51) Int. Cl.
| | |
|---|---|
| G06F 15/16 | (2006.01) |
| H04L 12/18 | (2006.01) |
| H04M 3/56 | (2006.01) |
| H04W 76/00 | (2009.01) |

(52) U.S. Cl.
CPC .......... *H04L 12/189* (2013.01); *H04L 12/1822* (2013.01); *H04M 3/567* (2013.01); *H04W 76/005* (2013.01)
USPC ........... 709/204; 370/235; 370/254; 455/455; 455/518

(58) Field of Classification Search
USPC ........................................................ 709/204
See application file for complete search history.

(56) References Cited

U.S. PATENT DOCUMENTS

| | | | |
|---|---|---|---|
| 2004/0077358 A1 | 4/2004 | Bennett et al. | |
| 2006/0250961 A1* | 11/2006 | Vasseur | 370/235 |

(Continued)

FOREIGN PATENT DOCUMENTS

| | | |
|---|---|---|
| CN | 101047534 A | 10/2007 |
| JP | 2006197461 A | 7/2006 |

(Continued)

OTHER PUBLICATIONS

International Search Report, PCT/US2010/029783, International Searching Authority, European Patent Office, Jul. 5, 2010.

(Continued)

*Primary Examiner* — Hua Fan
(74) *Attorney, Agent, or Firm* — Raphael Freiwirth (57) ABSTRACT

A call request message is sent from an access terminal to an application server in order to request initiation of a group communication session to a communication group and to request that an allocation of the floor to the given access terminal for the duration of the given group communication session remain uninterrupted by call targets of the session. The application server announces the session, and sends a floor-grant to the access terminal after the session is accepted by at least one target. The access terminal forwards media to the application server which is then forwarded to the at least one target. The floor is not transferred away from the access terminal during the session. For example, floor requests are suppressed at the at least one target, or floor requests are sent by the at least one target but are then ignored or denied by the application server.

27 Claims, 6 Drawing Sheets

(56) References Cited

U.S. PATENT DOCUMENTS

2007/0281723 A1    12/2007   Chotai et al.
2008/0144525 A1    6/2008   Crockett et al.

FOREIGN PATENT DOCUMENTS

JP     2008546301 A    12/2008
WO    2006129985    12/2006

OTHER PUBLICATIONS

Written Opinion, PCT/US2010/029783, International Searching Authority, European Patent Office, Jul. 5, 2010.
European Search Report—EP12170116—Search Authority—Munich—Jun. 18, 2013.
Co-pending U.S. Appl. No. 09/518,622, filed Mar. 3, 2000.

\* cited by examiner

UNINTERRUPTABLE GROUP COMMUNICATION SESSIONS WITHIN A WIRELESS COMMUNICATIONS SYSTEM

CLAIM OF PRIORITY UNDER 35 U.S.C. §119

The present Application for Patent claims priority to Provisional Application No. 61/166,611, entitled "UNINTERRUPTABLE GROUP COMMUNICATION SESSIONS WITHIN A WIRELESS COMMUNICATIONS SYSTEM", filed Apr. 3, 2009, which is assigned to the assignee hereof and hereby expressly incorporated by reference herein in its entirety.

BACKGROUND OF THE INVENTION

1. Field of the Invention

The invention relates to uninterruptable group communication sessions within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as a group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

In addition to various transmission schemes (e.g., unicast, multicast, broadcast) that may be used, generally, a PTT or PTT over Cellular (PoC) call corresponds to a server mediated communication between two or more identified access terminals, regardless of the various configurations used to conduct the PTT calls. Further, conventionally, PTT calls are initiated and maintained by a physical interaction at the access terminal (e.g., pressing and holding a key).

SUMMARY

A call request message is sent from an access terminal to an application server in order to request initiation of a group communication session to a communication group and to request that an allocation of the floor to the given access terminal for the duration of the given group communication session remain uninterrupted by call targets of the session. The application server announces the session, and sends a floor-grant to the access terminal after the session is accepted by at least one target. The access terminal forwards media to the application server which is then forwarded to the at least one target. The floor is not transferred away from the access terminal during the session. For example, floor requests are suppressed at the at least one target, or floor requests are sent by the at least one target but are then ignored or denied by the application server.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to a PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1:
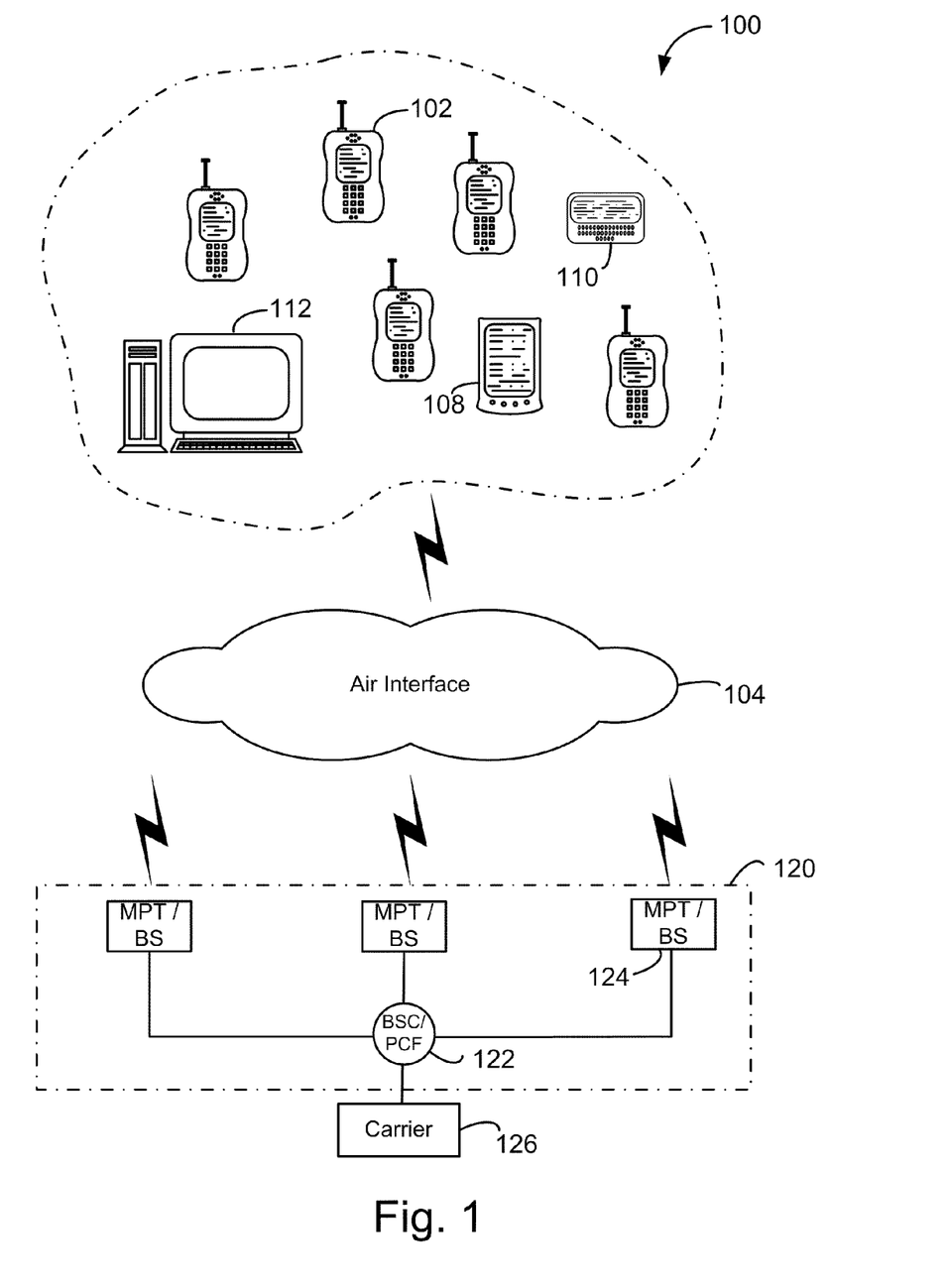
FIG. 1 is a diagram of a wireless network architecture that supports access terminals and access networks in accordance with at least one embodiment of the invention.

FIG. 1 illustrates a block diagram of one exemplary embodiment of a wireless system 100 in accordance with at least one embodiment of the invention. System 100 can contain access terminals, such as a cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal," "wireless device," "client device," "mobile terminal" and variations thereof may be used interchangeably.

Referring back to FIG. 1, the components of the wireless system 100 and interrelation of the elements of the exemplary embodiments of the invention are not limited to the configuration illustrated. System 100 is merely exemplary and can include any system that allows remote access terminals, such as wireless client computing devices 102, 108, 110, 112, to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
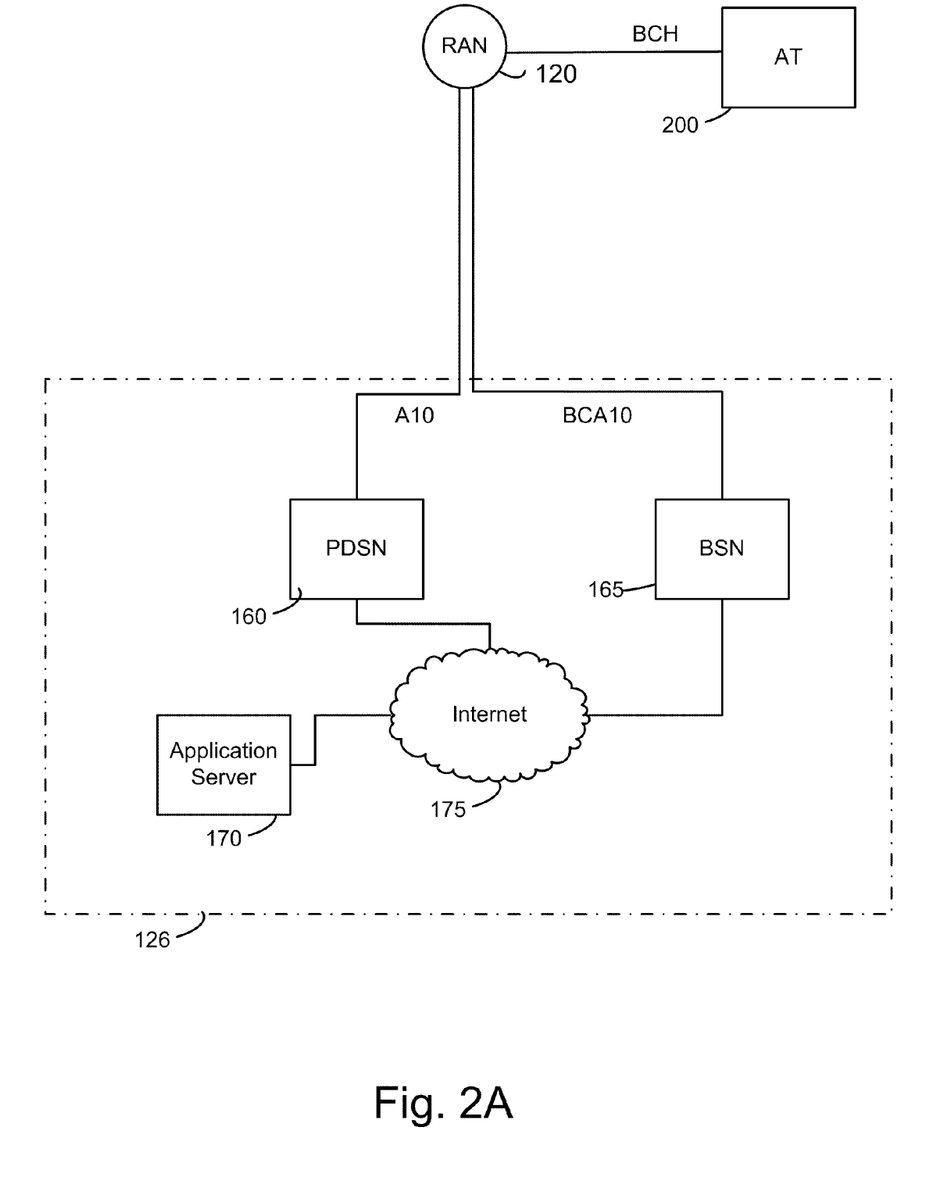
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
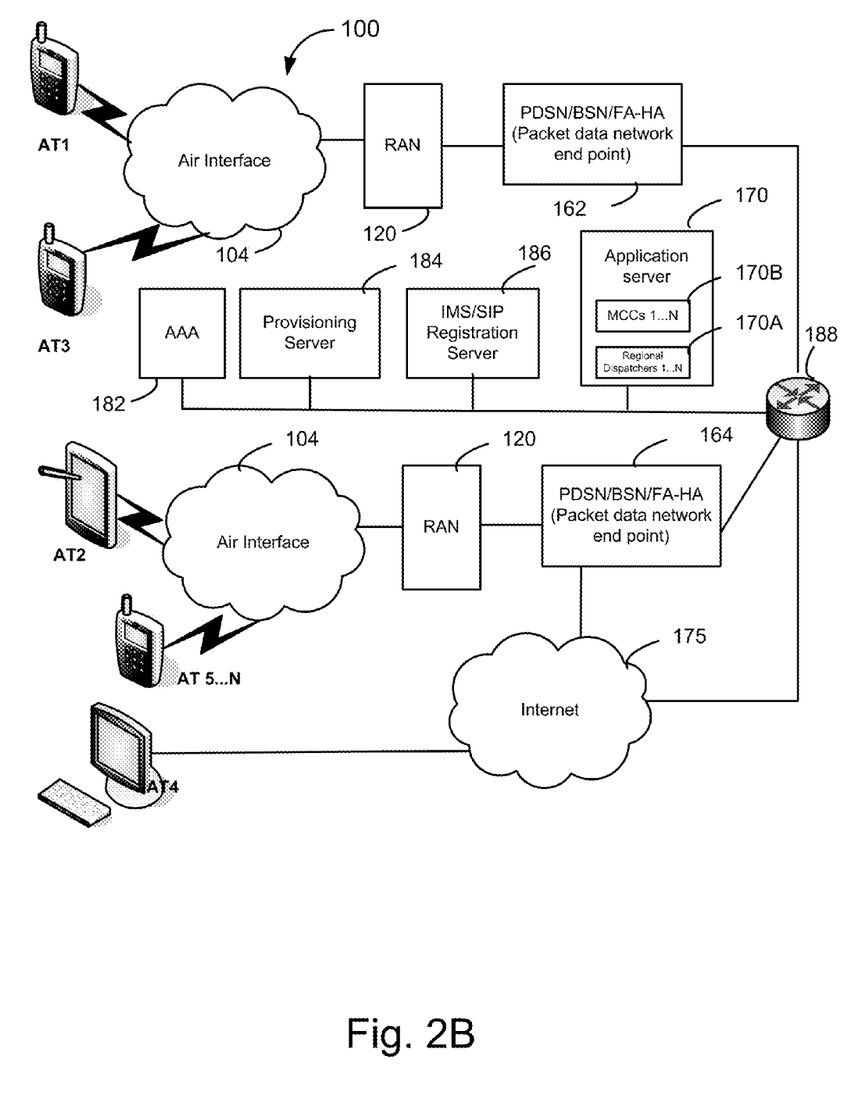
FIG. 2B illustrates an example of the wireless communication 100 of FIG. 1 in more detail.

FIG. 2B illustrates an example of the wireless communication 100 of FIG. 1 in more detail. In particular, referring to FIG. 2B, ATs 1 ... N are shown as connecting to the RAN 120 at locations serviced by different packet data network endpoints. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 ... N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 ... N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session. Accordingly, in another embodiment of the invention, the MCCs 170B may be referred to as PTT application servers and/or PTT media-distribution servers, assuming the arbitrated communication sessions correspond to PTT calls.

Figure 3:
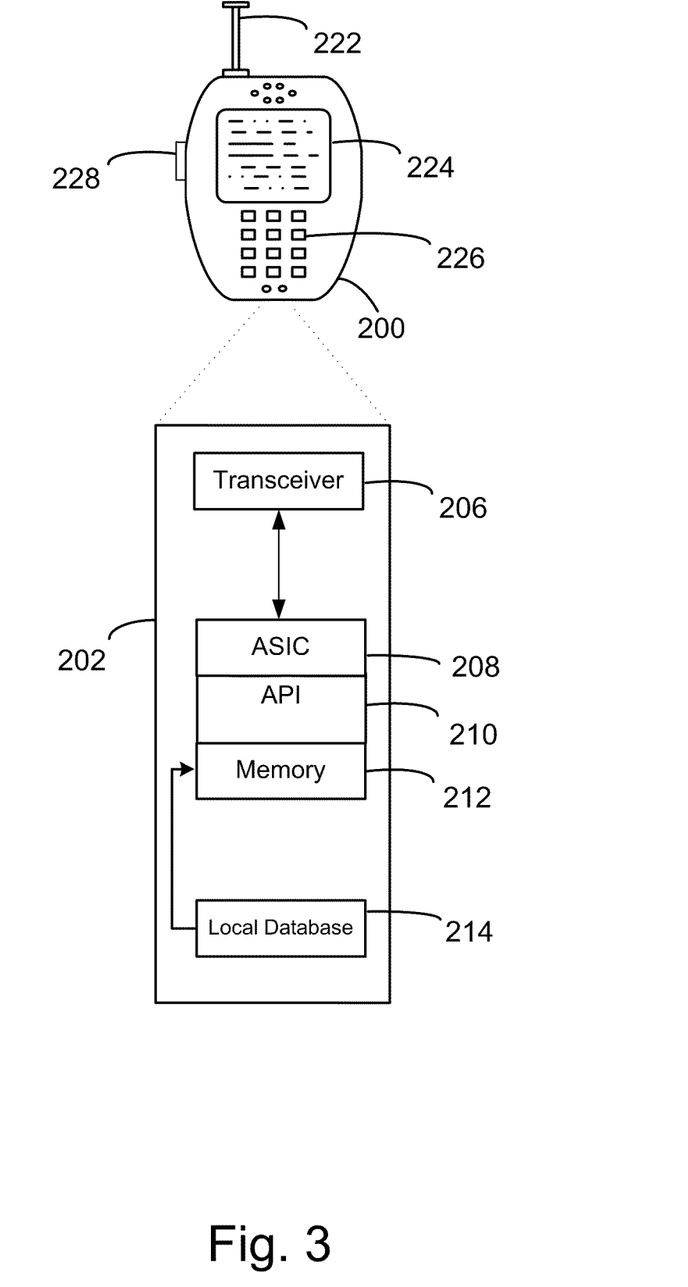
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet 175 and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal 200 in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

In a conventional half-duplex group communication session, the application server 170 grants the floor to one group member at a time, and forwards media from the current floor-holder to each other group member that has joined the session. The media may be forwarded by the application server 170 based on Internet Protocol (IP) unicasting protocols (e.g., the RAN 120 is instructed to transmit the forwarded media on a downlink dedicated channel separately to each target AT), IP multicasting protocols (e.g., the RAN 120 is instructed to transmit the forwarded media on a downlink shared channel in at least one sector of the wireless communications system 100 potentially to multiple target ATs within the at least one sector at the same time) or a combination thereof. During the group communication session, the application server 170 may transfer the floor from one group member to another member (i) if the current floor-holder releases the floor and a new group member then requests the floor, (ii) if a group member with a higher preemption rank than the current floor-holder requests the floor while the current floor-holder is still sending media, (iii) if the current floor-holder has held the floor for a threshold period of time and another group-member requests the floor at least a threshold number of time, (iv) if the group communication session restricts floor-holders to a given period of time as floor-holder and the current floor-holder has exceeded the given period of time (e.g., a fail-safe timer) and/or (v) any combination thereof. As will be appreciated, (i)-(v) are simply examples, and the floor can be transferred away from the floor-holder for other reasons as well (e.g., inactivity, etc.). In the case of (ii), an operator of the application server 170 inputs preemption ranks for each of the group members before the session is initiated, and then evaluates the relative preemption ranks to resolve floor contention scenarios during an active group communication session, such as whether to oust a current floor-holder in favor of another group member in the event of a floor-request being received while the current floor-holder is still speaking As will be appreciated, the use of preemption ranks is merely one example of conventional talker-arbitration for the group communication session.

It is generally difficult to change the preemption ranks of the group members for specific communication sessions because the operator of the application server 170 typically enters this information manually. Thus, if a particular group member wishes to make an announcement to the group but does not want to receive feedback or pass the floor during the announcement, the group member (i.e., call originator in this case) would either have to (i) have a highest-possible preemption rank, (ii) request that the application server's 170 operator temporarily or permanently raise the call originator's preemption rank to the highest level (iii) or else the call originator will simply have to accept that the floor could potentially be taken away during the session. Thus, it is difficult to conduct group communication sessions with a guarantee that the call originator will be uninterrupted with conventional floor-handling protocols.

Accordingly, embodiments of the invention are directed to ensuring or guaranteeing that call originators with sufficient privileges can conduct uninterruptable group communication sessions without the risk that the call originators will lose the floor to other group members before the sessions have completed. As used herein, an "uninterruptable group communication session" corresponds to a group communication session where the floor cannot be transferred to a session participant other than the call originator. For example, even if the group communication session violates one or more operator-defined rules by permitting a floor-holder to hold onto the floor (e.g., the current floor-holder has had the floor too long, a number of other group-members have been constantly requesting the floor, the current floor-holder is inactive, etc.), an uninterruptable group communication session will still maintain the call originator as floor-holder.

Figure 4:
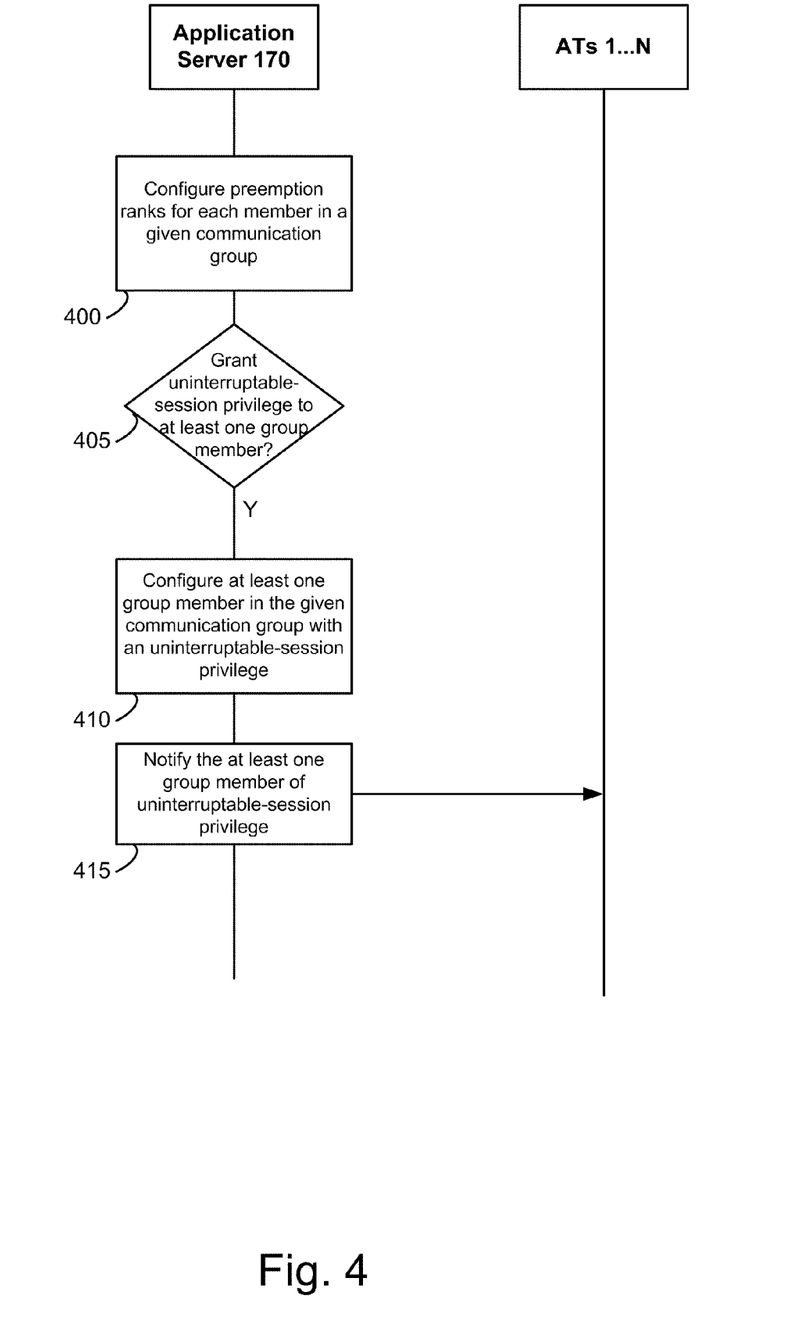
FIG. 4 illustrates a half-duplex group communication session privilege configuration process in accordance with an embodiment of the invention.

FIG. 4 illustrates a communication group privilege setting and distribution process in accordance with an embodiment of the invention. Referring to FIG. 4, an operator of the application server 170 configures preemption ranks or priorities for each member in a given communication group (e.g., a multicast group) in block 400. The setting of the preemption ranks in block 400 is generally known in the art, and will not be described further for the sake of brevity.

Next, the operator of the application server 170 determines whether to allocate an uninterruptable session privilege to any of the group members in determination block 405. If the operator of the application server 170 determines not to grant or allocate any group member an uninterruptable session privilege in determination block 405, the process of FIG. 4 ends and the configuration of FIG. 4 becomes similar to that of the conventional art, such that the preemption ranks established in block 400 control floor-handling for any group communication session arbitrated by the application server 170 involving the given communication group.

Otherwise, if the operator of the application server 170 determines to grant at least one group member an uninterruptable session privilege in determination block 405, the operator configures the at least one group member with the uninterruptable session privilege in block 410. In an example, the configuration in block 410 may involve setting an uninterruptable session privilege parameter within a record for the at least one group member maintained at the application server 170 to a given logic level (e.g., "1" instead of "0"), with the given logic level setting of the uninterruptable session privilege parameter (e.g., "1") indicating that the at least one group member has the uninterruptable session privilege. In another example, the configuration in block 410 may involve setting a "type" field within the record of the at least one group member to indicate that the at least one group member has a number of certain privileges, including but not limited to the uninterruptable session privilege. In another example, the record could reflect the type of device used by the at least one group member, whereby the uninterruptable session privilege is assumed based on the type of device, such as if the type of the at least one group member as indicated in the record corresponds to a public safety device. In block 415, the provisioning server 184 notifies the at least one group member of the uninterruptable session privilege (e.g., so that a multimedia client at the at least one group member will permit specially configured call messages to request an uninterruptable group communication session).

Figure 5:
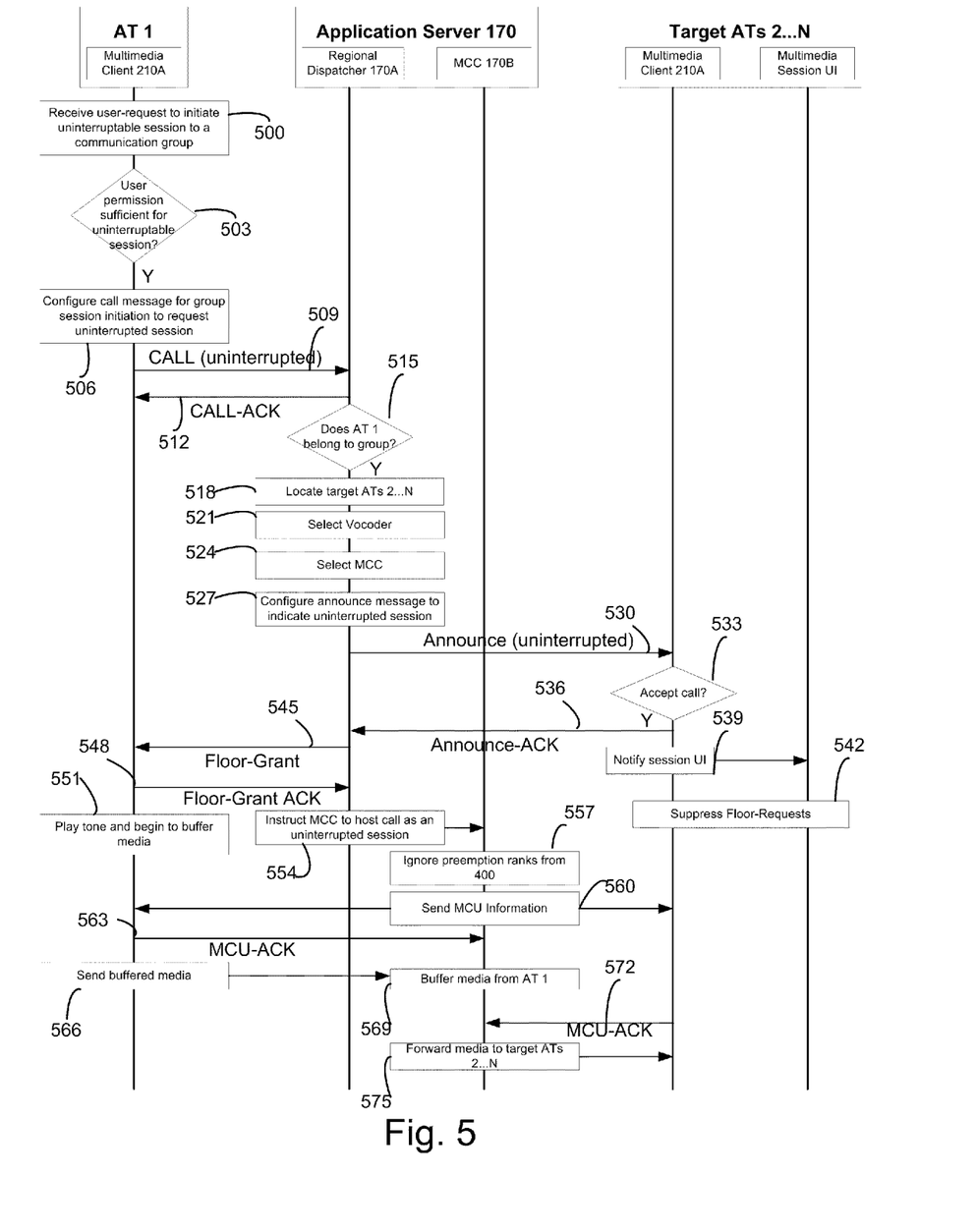
FIG. 5 illustrates an uninterruptable half-duplex group communication session in accordance with an embodiment of the invention.

FIG. 5 illustrates an uninterruptable half-duplex group communication session in accordance with an embodiment of the invention. Referring to FIG. 5, assume that the process of FIG. 4 has already executed and that AT 1 has been allocated the uninterruptable session privilege in blocks 405, 410, and that AT 1 is notified of the uninterruptable session privilege in block 415. Further, the operations performed at AT 1 in FIG. 5 are performed at a multimedia client 210A, where the multimedia client 210A corresponds to an API among APIs 210 as described with respect to AT 200 of FIG. 3. The multimedia client 210A is responsible for managing group communication sessions at AT 1.

Accordingly, referring to FIG. 5, assume that the multimedia client 210A of AT 1 receives a user-request to initiate an uninterruptable session to a given communication group in block 500. For example, if the requested session corresponds to a push-to-talk (PTT) or push-to-transfer (PTX) session, the user-request may correspond to a user of AT 1 pressing a PTT or PTX button and separately indicating that the PTT/PTX session is intended to be uninterrupted. In another example, the requested session can correspond to a full-duplex session even though full-duplex sessions do not typically include talker-arbitration because each call-participant is permitted to talk. However, if the full-duplex session were specially established to be initiated in a 'lecture' mode whereby the target audience is not expected to talk and/or interrupt the speaker or lecturer, the requested session can be implemented as an uninterruptable half-duplex session despite being set-up as a full-duplex session. Next, the multimedia client 210A of AT 1 determines whether the user of AT 1 has sufficient permission to request the uninterruptable session in determination block 503. For example, after AT 1 receives the notification that AT 1 is permitted to initiate uninterruptable group communications sessions in block 415 of FIG. 4, the multimedia client 210A at AT 1 can set an uninterruptable session privilege parameter for sessions involving the communication group to a given logic level (e.g., "1" instead of "0"), with the given logic level setting of the uninterruptable session privilege parameter (e.g., "1") indicating that AT 1 has the uninterruptable session privilege. In this example, the determination in determination block 503 corresponds to checking the logic level of the uninterruptable session privilege parameter to determine if AT 1 is permitted to request the uninterruptable group communication session.

In determination block 503, assume that the multimedia client 210A of AT 1 determines AT 1 to have sufficient permission to request initiation for the uninterruptable group communication session. Accordingly, the multimedia client 210A of AT 1 configures a call message to request initiation of an uninterruptable group communication session in block 506. For example, the configuration in block 506 may correspond to generating a standard call message and then modifying one or more fields of the standard call message to convey, to the application server 170, that AT 1 is attempting to initiate an uninterruptable session. In an example, the modified field of the call message may correspond to a Diffserv Code Point (DSCP) value in a header portion of the call message being set to a pre-established value that the application server 170 knows to interpret as a request for an uninterruptable session.

After the configuration in block 506, AT 1 transmits the configured call message 509 to the RAN 120 (not shown), that forwards the configured call message to a given regional dispatcher 170A of the application server 170. The application server 170 acknowledges receipt of the call message by transmitting an ACK message 512 back to AT 1. The regional dispatcher 170A evaluates the call message 509 and determines whether AT 1 belongs to the communication group to which AT 1 is attempting to communicate in determination block 515. It may be assumed that AT 1 belongs to the communication group (i.e. determination block 515="Y"), and the regional dispatcher 170A then locates each of target ATs 2 ... N (e.g., the regional dispatcher 170A determines if the target ATs are registered with the application server 170, and if so, obtains their respective IP addresses) in block 518, selects a vocoder for the communication session in block 521 and selects one of the plurality of MCCs 170B to handle the communication session in block 524. The regional dispatcher 170A then generates an announce message to announce the communication session to the target ATs 2 ... N, and configures the announce message to indicate, to the target ATs 2 ... N, that the communication session is an uninterruptable communication session in block 527. In an example, similar to the configured call message described above with reference to block 506, the announce message can be configured to include a pre-established DSCP value in a header portion that target ATs 2 ... N will interpret as being indicative of an uninterruptable group communication session. The regional dispatcher 170A then forwards the configured announce message 530 to the RAN 120 (not shown) for transmission to ATs 2 ... N.

While not shown explicitly in FIG. 5, it will be appreciated that the multimedia client 210A of AT 1 itself enforces whether the user of AT 1 has sufficient privileges to request initiation of the uninterruptable group communication session (e.g., in determination block 503). In an alternative embodiment, the enforcement can be performed at the application server 170, in which case a decision block could be added after block 509 and before block 527 to confirm that AT 1 has sufficient privileges to request the uninterruptable group communication session, and if not, the application server 170 would simply ignore the call message and would not announce the call.

Next, assume that target ATs 2 ... N receive the configured announce message 530 and that at least one of target ATs 2 ... N determines to accept the announced call (i.e., determination block 533="Y"). For example, each of target ATs 2 ... N that is not currently busy (e.g., engaged in another call) determines to accept the call in determination block 533. Alternatively, in another example, announcements for uninterruptable group communication sessions can force target ATs to drop a current session, if present, and to accept the uninterruptable group communication session. In this example, the target ATs 2 ... N as well as the call originator AT 1 can also be forced to reject any subsequent announce messages for other communication sessions during the duration of the uninterruptable group communication session.

Accordingly, each target AT that determines to accept the announced call sends an announce ACK (accept) message 536 to the regional dispatcher 170A, 536, and notifies a multimedia session user interface (UI) of the target ATs to notify users thereof to expect incoming uninterruptable group communication session media in block 539. Also, because the communication session is uninterruptable, in an example, any attempts by users of ATs 2 ... N to request the floor are suppressed by the multimedia clients 210A at ATs 2 ... N in block 542, such that floor-request messages are not sent to the regional dispatcher 170A by the target ATs 2 ... N. In another example, the floor-requests can be suppressed differently, such as by logic contained at the RAN 120 and/or the application server 170.

Upon receiving the announce ACK (accept) message 536 from a first of ATs 2 ... N ("first responder"), the regional dispatcher 170A sends a floor-grant message 545 to AT 1, to prompt a user of AT 1 to begin buffering media for eventual transmission to the application server 170 for forwarding to the target ATs 2 ... N. AT 1 receives the floor-grant message 545 from the regional dispatcher 170A and acknowledges receipt of the floor-grant message 545 with an ACK message 548. The multimedia client 210A then instructs AT 1 to play a tone to inform a user of AT 1 to begin inputting media (e.g., voice data), and the multimedia client 210A buffers the media input by the user of AT 1 in block 551. Upon receiving the floor-grant ACK 548 from AT 1, the regional dispatcher 170A instructs the MCC 170B selected in block 524 to begin hosting the communication session as an uninterruptable session in block 554. Accordingly, the MCC 170B will ignore the relative preemption ranks of the ATs participating in the communication session, and will maintain AT 1 as the floor-holder throughout the communication session in block 557. In other words, if the MCC 170B receives any floor-requests from ATs 2 ... N during the uninterruptable group communication session, the MCC 170B will deny the floor-requests and the MCC 170B will not revoke the floor from the current floor-holder irrespective of whether maintaining the floor with the current floor-holder violates one or more rules (e.g., such as how long a floor-holder is typically permitted to hold onto the floor, etc.). The MCC 170B then sends media control unit (MCU) information to call originator (and current floor-holder) AT 1 as well as target ATs 2 ... N in block 560. The MCU is a software process or instance that handles a single instance for a call or communication session, and the MCU information corresponds to a contact message, and includes the IP address and port number regarding where floor-holders are to forward media for re-transmission to the rest of the group during the session (e.g., as in block 566 below), or signaling messages such as ACKs 563, 572).

AT 1 receives the MCU information from the MCC 170B, and acknowledges receipt of the MCU information with an ACK message 563. Also, upon receiving the MCU information from the MCC 170B, the multimedia client 210A begins transmitting the buffered media to the MCC 170B in block 566, which in turn buffers the media forwarded from AT 1 in block 569. Next, the MCC 170B waits to receive at least one ACK 572 from target ATs 2 ... N to the MCU information transmitted in block 560. In an example, the MCC 170B can wait for a first MCU-information ACK from any of target ATs 2 ... N and can then begin forwarding the buffered media. In an alternative example, the MCC 170B can wait for MCU-information ACKs from a given percentage of target ATs 2 ... N (e.g., of each target to which the announce message 530 was sent, or of each target that accepted the call via the ACK message 536) before forwarding any of the buffered media. In another alternative example, the MCC 170B can wait for MCU-information ACKs from each of target ATs 2 ... N (e.g., of each target to which the announce message 530 was sent, or of each target that accepted the call via the ACK message 536), such that the given percentage equals 100%, before forwarding any of the buffered media (e.g., if it is important for each target AT to receive the full media-flow). In any case, one or more ACKs 572 from target ATs 2 ... N are received at the MCC 170B. When the number of MCU-information ACKs 572 from the target ATs 2 ... N satisfies a given threshold (e.g., a first MCU-information ACK is received, a MCU-information ACK is received from each target AT to have accepted the call via the ACK message 536, a given percentage of target ATs 2 ... N that accepted the call via the ACK message 536, etc.), the MCC 170B forwards the buffered media to target ATs 2 ... N in block 575. Also, while the MCU-ACKs 572 are illustrated as arriving at the MCC 170B, if a sufficient number of MCU-ACKs 572 from target ATs 2 ... N arrive at the MCC 170B before media begins arriving from AT 1, it will be appreciated that the buffering in block 569 can be skipped and the MCC 170B can begin forwarding the media to ATs 2 ... N as soon as it is received.

While not shown in FIG. 5, if any of target ATs 2 ... N send floor-request messages despite the suppression of block 542, the MCC 170B will ignore the floor-request messages because the MCC 170B is aware that the communication session is intended to be uninterruptable from block 554.

Accordingly, as will be appreciated by one of ordinary skill in the art, a given call originator with sufficient privileges can establish a group communication session that is uninterruptable irrespective of its group preemption rank, thereby permitting the given call originator to forward media to a communication group without a risk of losing the floor to another group-member. Also, while examples above are generally directed to uninterruptable group communication sessions including audio media (e.g., voice), other embodiments can be directed to sessions that include audio and video or video-only.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on a non-transitory computer-readable medium. Non-transitory computer-readable media include both computer storage media and communication media including any medium that facilitates transfer of a computer program from one place to another. A non-transitory computer-readable storage medium may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of conducting a group communication session arbitrated by an application server within a wireless communications system, comprising:
   configuring a preemption rank for each of a plurality of group members of a given communication group, wherein the preemption rank is at least used to determine whether a non-floor-holder group member among the plurality of group members can obtain a floor for an active group communication session from a current floor-holder group member;
   determining whether to grant an uninterruptable group communication session privilege to at least one of the plurality of group members; and
   setting an uninterruptable session privilege parameter for the at least one of the plurality of group members when it is determined to grant the uninterruptable group communication session privilege to the at least one of the plurality of group members,
   wherein the uninterruptable group communication session privilege enables the at least one group member to originate a given group communication session that allocates the floor to the at least one group member for an entire duration of the given group communication session and for which the floor will not be transferred to another group member of the plurality of group members during the given group communication session irrespective of the preemption rank of the another group member of the plurality of group members or one or more rules defined by an operator.

2. The method of claim 1, further comprising:
   sending a notification to the at least one group member indicating that the at least one group member may originate the uninterruptable group communication session privilege.

3. The method of claim 1, wherein setting an uninterruptable session privilege parameter for the at least one of the plurality of group members when it is determined to grant the uninterruptable group communication session privilege enables the at least one group member to initiate at least one of an interruptible group communication session and an uninterruptable group communication session.

4. The method of claim 3, further comprising selecting the at least one group member to initiate the uninterruptable group communication session.

5. The method of claim 1, further comprising:
   receiving a call request message for an uninterruptable group communication session from the at least one group member, wherein the uninterruptable session privilege parameter is set for the at least one group member; and
   setting up the uninterruptable group communication session in response to receiving the call request message from the at least one group member.

6. A method of obtaining information related to a group communication session arbitrated by an application server within a wireless communications system, comprising:

receiving, at a given access terminal from the application server, a notification that the given access terminal has been granted an uninterruptable group communication session privilege, wherein:
    the given access terminal is associated with a first group member among a plurality of group members of a given communication group, each group member in the plurality of group members of the given communication group having a preemption rank configured by the application server, and
    the uninterruptable group communication session privilege enables the given access terminal to originate a given group communication session that allocates a floor to the given access terminal for an entire duration of the given group communication session and for which the floor will not be transferred to another group member among the plurality of group members of the given communication group during the given group communication session irrespective of the preemption rank of the another group member among the plurality of group members of the given communication group or one or more rules defined by an operator,
    wherein the preemption rank of each of the plurality of group members of the given communication group is at least used to determine whether a non-floor-holder group member among the plurality of group members of the given communication group can obtain the floor for an active group communication session from a current floor-holder group member among the plurality of group members of the given communication group; and
setting an uninterruptable session privilege parameter on the given access terminal in response to receiving the notification granting the uninterruptable group communication session privilege.

7. The method of claim 6, wherein setting the uninterruptable session privilege parameter enables the given access terminal to initiate an uninterruptable group communication session.

8. The method of claim 7, further comprising selecting to initiate the uninterruptable group communication session.

9. The method of claim 6, further comprising:
    determining whether the uninterruptable session privilege parameter is set;
    configuring a call request message to request initiation of an uninterruptable group communication session when it is determined that the uninterruptable session privilege parameter is set; and
    transmitting the call request message to the application server.

10. A non-transitory computer-readable storage medium containing instructions stored thereon, which, when executed by an application server cause a processor of the application server to perform operations for arbitrating a group communication session within a wireless communications system, the operations comprising:
    configuring a preemption rank for each of a plurality of group members of a given communication group, wherein the preemption rank is at least used to determine whether a non-floor-holder group member among the plurality of group members can obtain a floor for an active group communication session from a current floor-holder;
    determining whether to grant an uninterruptable group communication session privilege to at least one of the plurality of group members; and
    setting an uninterruptable session privilege parameter for the at least one of the plurality of group members when it is determined to grant the uninterruptable group communication session privilege to the at least one of the plurality of group members,
    wherein the uninterruptable group communication session privilege enables the at least one group member to originate a given group communication session that allocates the floor to the at least one group member for an entire duration of the given group communication session and for which the floor will not be transferred to another group member of the plurality of group members during the given group communication session irrespective of the preemption rank of the another group member of the plurality of group members or one or more rules defined by an operator.

11. The non-transitory computer-readable storage medium of claim 10, wherein the stored instructions are configured to cause the processor to perform operations further comprising sending a notification to the at least one group member indicating that the at least one group member may originate the uninterruptable group communication session privilege.

12. The non-transitory computer-readable storage medium of claim 10, wherein the stored instructions are configured to cause the processor to perform operations such that setting an uninterruptable session privilege parameter for the at least one of the plurality of group members when it is determined to grant the uninterruptable group communication session privilege enables the at least one group member to initiate at least one of an interruptible group communication session and an uninterruptable group communication session.

13. The non-transitory computer-readable storage medium of claim 12, wherein the stored instructions are configured to cause the processor to perform operations further comprising selecting the at least one group member to initiate the uninterruptable group communication session.

14. The non-transitory computer-readable storage medium of claim 10, wherein the stored instructions are configured to cause the processor to perform operations further comprising:
    receiving a call request message for an uninterruptable group communication session from the at least one group member, wherein the uninterruptable session privilege parameter is set for the at least one group member; and
    setting up the uninterruptable group communication session in response to receiving the call request message from the at least one group member.

15. A non-transitory computer-readable storage medium containing instructions stored thereon, which, when executed by an access terminal cause a processor of the access terminal to perform operations for obtaining information related to a group communication session arbitrated by an application server within a wireless communications system, the operations comprising:
    receiving, from the application server, a notification that the access terminal has been granted an uninterruptable group communication session privilege, wherein:
        the access terminal is associated with a first group member among a plurality of group members of a given communication group, each group member in the plurality of group members of the given communication group having a preemption rank configured by the application server, and
        the uninterruptable group communication session privilege enables the access terminal to originate a given group communication session that allocates a floor to the access terminal for an entire duration of the given group communication session and for which the floor will not be transferred to another group member among the plurality of group members of the given communication group during the given group communication session irrespective of the preemption rank of the another group member among the plurality of group members of the given communication group or one or more rules defined by an operator, wherein the preemption rank of each of the plurality of group members of the given communication group is at least used to determine whether a non-floor-holder group member among the plurality of group members of the given communication group can obtain the floor for an active group communication session from a current floor-holder group member among the plurality of group members of the given communication group; and setting an uninterruptable session privilege parameter on the access terminal in response to receiving the notification granting the uninterruptable group communication session privilege.

16. The non-transitory computer-readable storage medium of claim 15, wherein the stored instructions are configured to cause the processor to perform operations such that setting the uninterruptable session privilege parameter enables the access terminal to initiate an uninterruptable group communication session.

17. The non-transitory computer-readable storage medium of claim 16, wherein the stored instructions are configured to cause the processor to perform operations further comprising selecting to initiate the uninterruptable group communication session.

18. The non-transitory computer-readable storage medium of claim 15, wherein the stored instructions are configured to cause the processor to perform operations further comprising:
 determining whether the uninterruptable session privilege parameter is set;
 configuring a call request message to request initiation of an uninterruptable group communication session when it is determined that the uninterruptable session privilege parameter is set; and
 transmitting the call request message to the application server.

19. An application server configured to arbitrate a group communication session within a wireless communications system, comprising:
 a processor configured with processor-executable instructions to perform operations comprising:
  configuring a preemption rank for each of a plurality of group members of a given communication group, wherein the preemption rank is at least used to determine whether a non-floor-holder group member among the plurality of group members can obtain a floor for an active group communication session from a current floor-holder group member;
  determining whether to grant an uninterruptable group communication session privilege to at least one of the plurality of group members; and
  setting an uninterruptable session privilege parameter for the at least one of the plurality of group members when it is determined to grant the uninterruptable group communication session privilege to the at least one of the plurality of group members,
  wherein the uninterruptable group communication session privilege enables the at least one group member to originate a given group communication session that allocates the floor to the at least one group member for an entire duration of the given group communication session and for which the floor will not be transferred to another group member of the plurality of group members during the given group communication session irrespective of the preemption rank of the another group member of the plurality of group members or one or more rules defined by an operator.

20. The application server of claim 19, wherein the processor is configured with processor-executable instructions to perform operations further comprising sending a notification to the at least one group member indicating that the at least one group member may originate the uninterruptable group communication session privilege.

21. The application server of claim 19, wherein the processor is configured with processor-executable instructions to perform operations such that setting an uninterruptable session privilege parameter for the at least one of the plurality of group members when it is determined to grant the uninterruptable group communication session privilege enables the at least one group member to initiate at least one of an interruptible group communication session and an uninterruptable group communication session.

22. The application server of claim 21, wherein the processor is configured with processor-executable instructions to perform operations further comprising selecting the at least one group member to initiate the uninterruptable group communication session.

23. The application server of claim 19, wherein the processor is configured with processor-executable instructions to perform operations further comprising:
 receiving a call request message for an uninterruptable group communication session from the at least one group member, wherein the uninterruptable session privilege parameter is set for the at least one group member; and
 setting up the uninterruptable group communication session in response to receiving the call request message from the at least one group member.

24. An access terminal configured to obtain information related to a group communication session arbitrated by an application server within a wireless communications system, comprising:
 a processor configured with processor-executable instructions to perform operations comprising:
  receiving, at the access terminal from the application server, a notification that the access terminal has been granted an uninterruptable group communication session privilege, wherein:
   the access terminal is associated with a first group member among a plurality of group members of a given communication group, each group member in the plurality of group members of the given communication group having a preemption rank configured by the application server, and
   the uninterruptable group communication session privilege enables the access terminal to originate a given group communication session that allocates a floor to the access terminal for an entire duration of the given group communication session and for which the floor will not be transferred to another group member among the plurality of group members of the given communication group during the given group communication session irrespective of a the preemption rank of the another group member among the plurality of group members of the given communication group or one or more rules defined by an operator, wherein the preemption rank of each of the plurality of group members of the given communication group is at least used to determine whether a non-floor-holder group member among a the plurality of group members of the given communication group can obtain the floor for an active group communication session from a current floor-holder group member among the plurality of group members of the given communication group; and setting an uninterruptable session privilege parameter on the access terminal in response to receiving the notification granting the uninterruptable group communication session privilege.

25. The access terminal of claim 24, wherein the processor is configured with processor-executable instructions to perform operations such that setting the uninterruptable session privilege parameter enables the access terminal to initiate an uninterruptable group communication session.

26. The access terminal of claim 25, wherein the processor is configured with processor-executable instructions to perform operations further comprising selecting to initiate the uninterruptable group communication session.

27. The access terminal of claim 24, wherein the processor is configured with processor-executable instructions to perform operations further comprising:

determining whether the uninterruptable session privilege parameter is set;

configuring a call request message to request initiation of an uninterruptable group communication session when it is determined that the uninterruptable session privilege parameter is set; and transmitting the call request message to the application server.

* * * * *